(12) United States Patent
Chebesov (10) Patent No.: US 12,475,218 B2
(45) Date of Patent: Nov. 18, 2025

(54) METHOD AND SYSTEM FOR IDENTIFYING A COMPROMISED POINT-OF-SALE TERMINAL NETWORK

(71) Applicant: GROUP-IB GLOBAL PRIVATE LIMITED, Moscow (RU)

(72) Inventor: Ruslan Chebesov, Desnogorsk (RU)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 247 days.

(21) Appl. No.: 17/973,004

(22) Filed: Oct. 25, 2022

(65) Prior Publication Data
US 2023/0161876 A1 May 25, 2023

(30) Foreign Application Priority Data
Nov. 22, 2021 (RU) .......................... RU2021133879

(51) Int. Cl.
*G06Q 20/20* (2012.01)
*G06F 21/55* (2013.01)

(52) U.S. Cl.
CPC ...... *G06F 21/554* (2013.01); *G06F 2221/034* (2013.01)

(58) Field of Classification Search
CPC . G06F 21/554; G06F 2221/034; G06Q 20/20; G06Q 20/4016
See application file for complete search history.

(56) References Cited

U.S. PATENT DOCUMENTS 9,773,227 B2 * 9/2017 Zoldi .................... G06Q 10/10
10,607,228 B1 3/2020 Gai et al.
(Continued)

FOREIGN PATENT DOCUMENTS

AU 2012230299 A1 10/2013
AU 2012230299 B2 4/2016
(Continued)

OTHER PUBLICATIONS

Murray, A. (Aug. 20, 2021). Excel COUNTIF and COUNTIFS Function [How-To Guide]. CareerFoundry. https://careerfoundry.com/en/blog/data-analytics/countifs-function-excel/ (Year: 2021).*
(Continued)

*Primary Examiner* — John B King
*Assistant Examiner* — Nicholas Joseph Diluzio
(74) *Attorney, Agent, or Firm* — BCF LLP (57) ABSTRACT

A method and a system for identifying a compromised Point-of-Sale (POS) terminal network are provided. The method comprises: receiving identifiers of a plurality of compromised geographical areas identifying, in a given compromised geographical area of the plurality of compromised geographical areas, at least one respective POS terminal network of a plurality of POS terminal networks; determining, for the at least one respective POS terminal network, a plurality of compromise parameters; determining, based on the plurality of compromise parameters, a respective compromise probability value for the at least one respective POS terminal network; ranking, by the processor, the plurality of POS terminal networks according to respective compromise probability values associated therewith; and determining a top-ranked POS terminal network as being the compromised POS terminal network.

10 Claims, 3 Drawing Sheets

(56) References Cited

U.S. PATENT DOCUMENTS

| | | | |
|---|---|---|---|
| 10,749,892 B2* | 8/2020 | Araujo | G06Q 20/4016 |
| 10,777,047 B1* | 9/2020 | Hamchuck | G06T 19/006 |
| 11,062,317 B2* | 7/2021 | Adjaoute | G06Q 20/4016 |
| 11,132,686 B2 | 9/2021 | Nightengale et al. | |
| 2010/0063917 A1* | 3/2010 | Pettitt | G06Q 30/0601 |
| | | | 705/325 |
| 2011/0307382 A1* | 12/2011 | Siegel | G06Q 20/04 |
| | | | 705/44 |
| 2016/0364727 A1* | 12/2016 | DeLawter | G06Q 20/389 |
| 2017/0237759 A1* | 8/2017 | Bell | H04L 63/1425 |
| | | | 726/23 |
| 2018/0005243 A1 | 1/2018 | Zovi et al. | |
| 2019/0318126 A1* | 10/2019 | Mascaro | G06F 16/9535 |
| 2019/0385170 A1* | 12/2019 | Arrabothu | G06N 3/08 |
| 2020/0211022 A1* | 7/2020 | Allbright | H04L 63/1408 |
| 2021/0125182 A1* | 4/2021 | Jain | G06Q 30/0605 |
| 2022/0353275 A1* | 11/2022 | Syngal | H04L 63/104 |
| 2023/0069999 A1* | 3/2023 | Duan | H04L 67/535 |

FOREIGN PATENT DOCUMENTS

| | | | | |
|---|---|---|---|---|
| RU | 2697953 C2 | | 8/2019 | |
| WO | WO-2012127023 A1 * | 9/2012 | | G06Q 20/4016 |
| WO | WO-2020107053 A1 * | 6/2020 | | G06Q 20/202 |

OTHER PUBLICATIONS

Illowsky, B., & Dean, S. (Mar. 27, 2020b). 1.3 Frequency, frequency tables, and levels of measurement—Statistics | OpenStax. https://openstax.org/books/statistics/pages/1-3-frequency-frequency-tables-and-levels-of-measurement (Year: 2020).*

Jacquette, D. (2008). Boole's logic. In Handbook of the history of logic (pp. 331-379). https://doi.org/10.1016/s1874-5857(08)80011-8 (Year: 2008).*

Search Report with regard to the counterpart NL Patent Application No. 2032025 completed Jan. 24, 2023.

Search Report with regard to the counterpart RU Patent Application No. 2021133879 completed Oct. 10, 2022.

"Nearly All U.S. Home Depot Stores Hit. Krebsonsecurity", Sep. 3, 2014, accessed on https://krebsonsecurity.com/2014/09/data-nearly-all-u-s-home-depot-stores-hit/, pdf 4 pages.

"Sally Beauty Hit By Credit Card Breach", Mar. 5, 2014, retrieved on krebsonsecurity.com/2014/03/sally-beauty-hit-by-credit-card-breach on Sep. 23, 2022, pdf 23 pages.

"ZIP Codes Show Extent of Sally Beauty Breach", Mar. 25, 2014, retrieved on https://krebsonsecurity.com/2014/03/zip-codes-show-extent-of-sally-beauty-breach/comment-page-1/ on Sep. 23, 2022, pdf 18 pages.

* cited by examiner

METHOD AND SYSTEM FOR IDENTIFYING A COMPROMISED POINT-OF-SALE TERMINAL NETWORK

CROSS-REFERENCE

The present application claims priority to a Russian Patent Application No.: 2021133879, filed on Nov. 22, 2021, entitled "METHOD AND SYSTEM FOR DETECTING A POS TERMINAL NETWORK COMPROMISE", the content of which is incorporated by reference in its entirety.

FIELD

The present technique relates to the field of cybersecurity and, more particularly, to a system and method for identifying a compromised Point-of-Sale (POS) terminal network.

BACKGROUND

A point-of-Sale (POS) terminal is a hardware system for processing contactless payments. This system can accept payment cards, such as those having a chip or a magnetic stripe, as well as other devices equipped with contactless interfaces, such as smartphones. For simplicity and clarity of the description, such devices configured to interact with POS terminals in a contactless manner, are collectively referred to hereinafter as "bankcards" regardless of their specific design.

A POS terminal is also sometimes referred to as a hardware/software module installed at the paymaster's workplace and generally includes a computing device running a POS terminal software module.

This computing device can be somehow compromised by fraudsters. If a POS terminal has been compromised, fraudsters may have an opportunity to access (copy) bankcard data that were used to make payments at this terminal. As a result, the bankcard can also be compromised, and the stolen data, as a rule, are collected by the fraudsters and subsequently are posted for sale in special web resources of so-called darknet (an Internet segment designed for anonymous communications).

In the context of the present specification a POS terminal network denotes a system of POS terminals located in points of sale belonging to the a given entity. It is obvious that generally there are many different, usually independent, POS terminal networks in each city or region. For example, one such network can belong to a petrol station company, another one to a flower shop chain, a third one to a given branch of a hotel complex, a fourth one to a restaurants chain, etc.

A method for automated verification of transaction legitimacy using a postal code specified by the bankcard owner during the bankcard issuing is known from the prior art. This check is called "Address Verification System" or AVS. The verification is based on the fact that the cardholder knows the postal code that he or she provided when issuing the card. When trying to make a payment or transfer, the cardholder is asked to confirm this postal code. If the postal code specified by the cardholder matches the postal code provided during the bankcard issuing, then the transaction is considered legitimate.

Based on the postal code check used by the AVS, a transaction legitimacy automated verification system has been developed, which, upon receipt of transaction data, compares the post address of ongoing transaction against a limited list of post addresses pre-established as allowed for this transaction. The list of allowed addresses is built in advance based on principle of proximity to the home address of the bankcard holder. The home address and postal code should be disclosed by the bankcard holder during issuing the bankcard. It is assumed that the bankcard holder will make most of the purchases in a relative proximity to home. In other words, this method is based on a premise that the bankcard holder is unlikely to make purchases from remote locations, for example, from different parts of the world. Consequently, if fraudsters have stolen card data and try to use these data by making a transaction from a location far from the bankcard holder's home, such transaction will be automatically blocked by the issuing bank. Such automatic verification system is currently implemented and intensively used by many banks. However, when the principle of AVS operation became known to fraudsters, they found ways to bypass it as well.

As was mentioned above, fraudsters sell databases containing information about compromised bankcards in specialized online stores of the darknet. Generally, databases of two types are offered for sale, CC and DUMP. CC type databases contain text data comprising card number, expiration date, CVV code, owner's name, etc. Typically, these data were collected by fraudsters when a user disclosed them during shopping in a web store. DUMP type databases contain information copied from magnetic stripe or chip on the bankcard. Fraudsters may be able to create these databases compromising POS terminals. Anybody skilled in the art can write such information onto a blank medium and fabricate a physical copy of a compromised card. The physical copy of the bankcard can be thereafter used by the fraudsters to pay in conventional offline stores that accept payments from banking cards. Hereinafter, DUMP type databases containing information copied from plastic cards are referred to as "bankcard dump databases" or simply "dump databases".

Besides the information copied from a plastic card, a bankcard DUMP database typically can include data of compromise location for the given bankcard, more particularly, postal code of the area where the compromised POS terminal, through which the fraudster copied the card information, was located. It is essential that a potential buyer, when using the acquired bankcard data, is also provided with postal codes corresponding to the region where he or she intends to use the fabricated copies of the bankcards for offline shopping. In this manner, fraudsters have succeeded in bypassing AVS systems since transactions each time take place in stores that are located physically close to the place where the original but compromised bankcard was intended to be used.

In particular, it is known that the leak of bankcard data that occurred in 2014 from Sally Beauty company's POSs was the result of the POS terminal network compromise. Articles on investigations into this case as of application filing date are available under the following URLs:

krebsonsecurity.com/2014/03/sally-beauty-hit-by-credit-card-breach/and krebsonsecurity.com/2014/03/zip-codes-show-extent-of-sally-beauty-breach/comment-page-1/.

These publications disclose the fact that the source of data leak was possible to establish by comparing list of postal codes from the bank cards dump posted up in the darknet with the list of postal codes within the area where Sally Beauty chain's points of sale were located, full coincidence of these lists being used as a criterion for making decisions on POS terminal network compromise.

However, these articles do not disclose any methods for detecting a compromised POS terminals network, if lists of postal codes from the bank card dump and a company's points of sale does not fully coincide. Besides, these articles do not disclose any methods of automated data analysis that would allow identifying a company's compromised POS terminals network among a variety of other companies having POSs within areas that corresponds to the list of postal codes from the bank card dump.

Certain prior art approaches have been proposed to tackle the above-identified technical problem.

U.S. Pat. No. 11,062,317-B2, issued on Jul. 13, 2021, assigned to Brighterion Inc., and entitled "DATA BREACH DETECTION", discloses a merchant data breach process which comprises processing daily payment transaction data with a risk and compliance platform to obtain a fraud score for each constituent transaction. Constituent transactions with high-risk fraud scores are sorted into a table according to the transaction date, cardholder, and merchant. The table data is scored according to suspected card visits, highly probable visits, and all card visits. The scores are normalized according to merchant size grouping through the use of multipliers. The normalized scores are summed together day-by-day into a final score. A timely warning of an underlying and expanding security rupture caused by a merchant data breach is issued for damage control and law enforcement.

However, it appears that this prior art method can only be implemented when a detailed information about transactions history is available; in other words, access to transaction database of the issuing bank is necessary for implementing the prior art methods.

SUMMARY

It is an object of the present technology to ameliorate at least some of the inconveniences associated with the prior art.

In accordance with a first broad aspect of the present technology, there is provided a computer-implementable method of identifying a compromised Point-of-Sale (POS) terminal network. The method is executable by a processor. The method comprises: receiving, by the processor, identifiers of a plurality of compromised geographical areas; identifying, by the processor, in a given compromised geographical area of the plurality of compromised geographical areas, at least one respective POS terminal network of a plurality of POS terminal networks, the at least one respective POS terminal network including a plurality of POS terminals in the given compromised geographical area associated with a respective entity; generating, by the processor, a potentially compromised POS terminal networks database including the plurality of POS terminal networks; determining, by the processor, for the at least one respective POS terminal network, a plurality of compromise parameters, the plurality of compromise parameters including at least one of: a frequency of occurrence of POS terminal networks associated with the respective entity in the plurality of compromised geographical areas; and a probability of occurrence of the POS terminal networks associated with the respective entity in the plurality of compromised geographical areas; determining, by the processor, based on the plurality of compromise parameters, a respective compromise probability value for the at least one respective POS terminal network; ranking, by the processor, the plurality of POS terminal networks according to respective compromise probability values associated therewith, thereby generating a ranked list of POS terminals networks; determining, by the processor, a top-ranked POS terminal network in the ranked list of POS terminal networks as being the compromised POS terminal network; and storing, by the processor, in the potentially compromised POS terminal networks database, data indicative of the top-ranked POS terminal network being compromised.

In some implementations of the method, the method further comprises, prior to the receiving the identifiers, generating a geographical database of identifiers of geographical areas and a commercial database of entities associated with the identifiers, and wherein the receiving comprises querying the geographical database.

In some implementations of the method, after the receiving the identifiers of compromised geographical areas, determining, by submitting a respective query to the geographic database, a respective territorial unit of a plurality of territorial units, with which the plurality of compromised geographical areas is associated.

In some implementations of the method, the determining the plurality of compromise parameters comprises querying the commercial database.

In some implementations of the method, the potentially compromised POS terminal networks database is configured to store at least one of: the identifiers of the plurality of compromised geographical areas; names of entities, whose POS terminal networks are located in respective ones of the plurality of compromised geographical areas; addresses of the entities, whose POS terminal networks are located in the respective ones of the plurality of compromised geographical areas, and territorial units corresponding to each one of the plurality of the compromised geographical areas.

In some implementations of the method, the determining the plurality of compromise parameters of the at least one respective POS terminal network comprises determining: a number of compromised geographical areas having at least one POS terminal network associated with the respective entity; a total number of compromised geographical areas in the plurality of compromised geographical areas; a number of POS terminal networks associated with the respective entity in the plurality of compromised geographical areas, and a total number of POS terminal networks associated with respective entity, located in each one of a plurality of territorial units, a respective one of the plurality of territorial units including the plurality of compromised geographical areas.

In some implementations of the method, the frequency of occurrence of the POS terminals networks associated with the respective entity in the plurality of compromised geographical areas is determined as a ratio between the number of compromised geographical areas having at least one POS terminal network associated with the respective entity and the total number of compromised geographical areas in the plurality of compromised geographical areas.

In some implementations of the method, the probability of occurrence of the POS terminal networks associated with the respective entity in the plurality of compromised geographical areas is determined as a ratio between the number of POS terminal networks associated with respective entity in the plurality of compromised geographical areas and the total number of the POS terminal networks associated with respective entity, located in each one of the plurality of territorial units.

In some implementations of the method, the determining the respective compromise probability value for the at least one respective POS terminal network comprises multiplying between the frequency and the probability of occurrence of the POS terminals networks associated with the respective entity in the plurality of compromised geographical areas.

In some implementations of the method, the determining the top-ranked POS terminal network comprises determining a sub-set of top-ranked POS terminal networks in the ranked list of POS terminal networks whose respective compromise probability values do not exceed a predetermined compromise probability threshold value.

In accordance with a second broad aspect of the present technology, there is provided a system for identifying a compromised Point-of-Sale (POS) terminal network. The system comprises a processor and a non-transitory computer-readable memory storing instructions. The processor, upon executing the instructions, is configured to: identify, in a given compromised geographical area of the plurality of compromised geographical areas, at least one respective POS terminal network of a plurality of POS terminal networks, the at least one respective POS terminal network including a plurality of POS terminals in the given compromised geographical area associated with a respective entity; generate a potentially compromised POS terminal networks database including the plurality of POS terminal networks; determine, for the at least one respective POS terminal network, a plurality of compromise parameters, the plurality of compromise parameters including at least one of: a frequency of occurrence of POS terminal networks associated with the respective entity in the plurality of compromised geographical areas; and a probability of occurrence of the POS terminal networks associated with the respective entity in the plurality of compromised geographical areas; determine, based on the plurality of compromise parameters, a respective compromise probability value for the at least one respective POS terminal network; rank the plurality of POS terminal networks according to respective compromise probability values associated therewith, thereby generating a ranked list of POS terminals networks; determine a top-ranked POS terminal network in the ranked list of POS terminal networks as being the compromised POS terminal network; and store, in the potentially compromised POS terminal networks database, data indicative of the top-ranked POS terminal network being compromised.

In the context of the present specification, the term "compromised POS terminals network" denotes a network in which a malicious hardware or software has been installed on at least one POS terminal to copy bank card data.

Further, in the context of the present specification, by compromised geographical areas, it is meant areas whose identifiers are listed in a bankcard dump database posted for sale. Compromised geographical area identifiers are identifiers of areas specified in a bankcard dump database.

Further, in the context of the present specification, Higher Level Administrative and Territorial Unit (HLATU) is a unit of administrative and territorial division in a particular country that is one level higher than the given area. HLATU for an area corresponding to a specific postal code can be, for example, district in Russia or county in the USA. Also, HLATU for district in Russia is a region, while HLATU for county in the USA is state. It may become apparent that the region or state is also a HLATU for an area corresponding to a post code or ZIP code.

Further, in the contest of the present specification, a "list of potentially compromised companies" denotes a list of companies that own points of sale located in compromised geographical areas.

Further, in the contest of the present specification, a bankcard dump database denotes a database containing information copied from the magnetic stripe or chip of original bank cards (also referred to herein as the dump database here for brevity).

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Non-limiting embodiments of the present technology are directed to a system and a computer implementable method for detecting a compromised POS terminals network. Broadly speaking, POS terminals can be compromised, for example, by installing malicious software or hardware such as a so-called skimmers onto these terminals. When conducting a payment using a compromised POS terminal, the skimmers can be configured to copy details of the bankcard used for this purpose. Further, the skimmers can be configured to transmit the so-copied data to electronic devices of fraudsters for further aggregation into dump databases. For example, such dump databases can be put on sale in the darknet.

In addition to data copied from magnetic stripes or chips of bank cards, dump databases frequently can also contain identifiers of areas where these data were copied using the compromised POS terminals. According to certain non-limiting embodiments of the present technology, the compromised geographical area identifiers can comprise, for example, without limitation, a postal or ZIP codes of compromise areas. Further, dump databases may additionally contain information about city and/or country corresponding to these identifiers.

For example, a given entry in the dump database can include a following line:

73301, USA,
where 73301 is an American postal code (ZIP code) while USA indicates the country corresponding to this code.

Thus, according to certain non-limiting embodiments of the present technology, a respective entry associated with any bankcard in the dump database is always associated with a compromised geographical area identifier, which indicates a specific area where the compromised POS terminal is located, and where the subject bankcard data was used.

However, as will become apparent from the description hereinbelow, compromised geographical area identifiers recorded in the dump database can be used to identify compromised POS terminal networks.

Figure 1A:
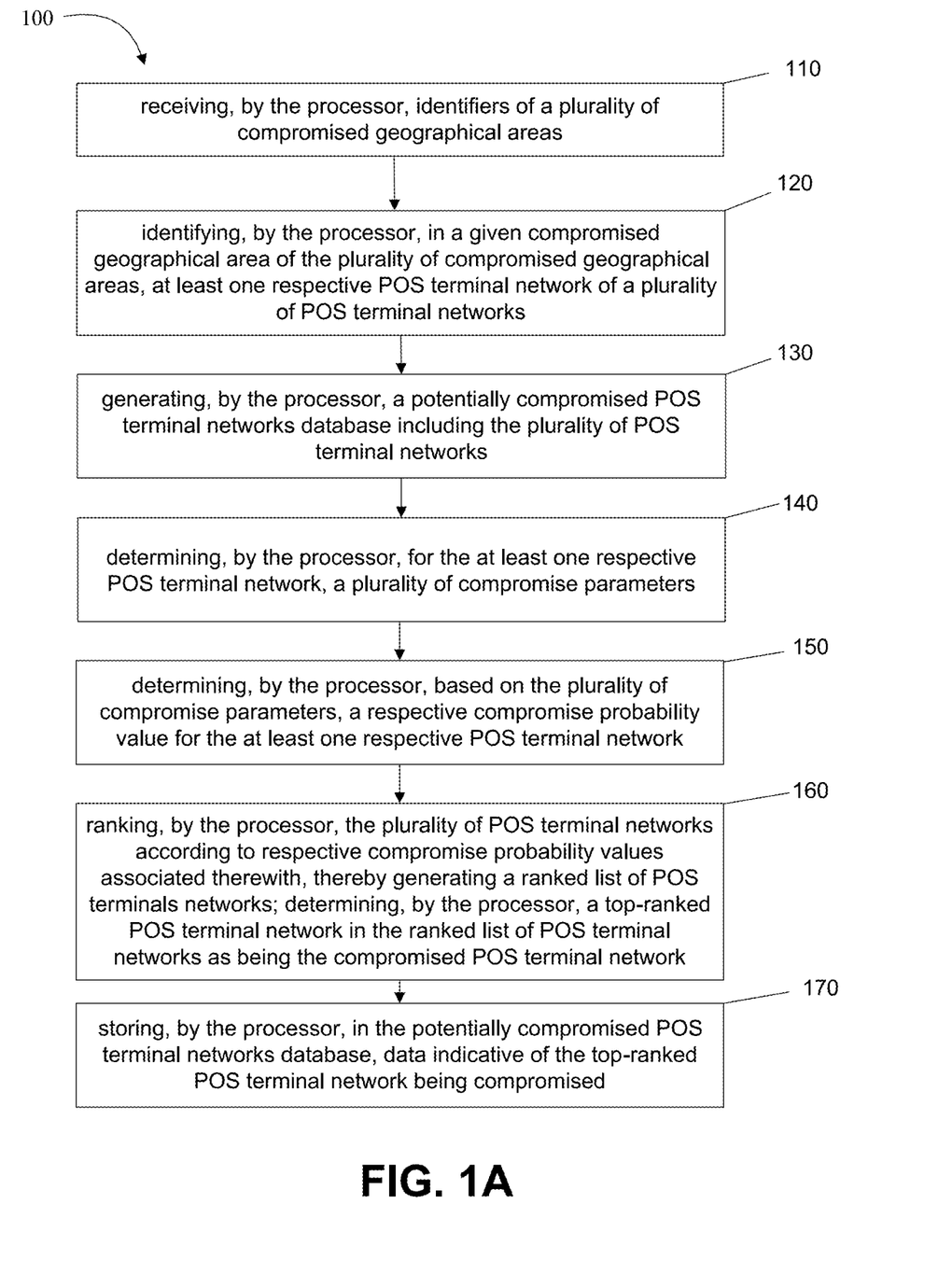
FIG. 1A depicts a flowchart diagram of a method of identifying compromised POS terminal networks, in accordance with certain non-limiting embodiments of the present technology.

With reference to FIG. 1A, there is depicted a flowchart diagram of a method 100 of identifying a compromised POS terminal network, in accordance with certain non-limiting embodiments of the present technology. The method 100 can be executed, for example, by a hardware processor, such as a processor 201 of a computing environment 200, described in detail below with reference to FIG. 2.

According to certain non-limiting embodiments of the present technology, before executing the steps of the method 100, the processor 201 can be configured to obtain a geographic database containing information about all existing area identifiers (for example, postal codes) and countries associated therewith. It is not limited how such a database can be obtained For example, in some non-limiting embodiments of the present technology, to build a geographic database, the processor 201 can be configured to load and execute a pre-configured script (search robot) configured to crawl and parse a communication network, to which the processor 201 has access, such as the Internet. First, the script is used to form and send search queries to any public search engine such as a Google search engine or a Yandex' search engine based on a preliminarily prepared list of countries and regions of the world. In case where the area identifier is the postal code, these search queries may have the following form:

"list of codes of [country_name]" or
"list of postal codes of [country_name]",
where field [country_name] in each query is for a specific name of the respective country or region from the preliminarily prepared list of countries and regions of the world. Similar search queries can be generated for street names, city names, or other area identifiers.

Further, the processor 201 can be configured to (i) analyze the search results for each sent query using the same script, and (ii) select at least one web resource containing the searched list. Finally, the processor 201 can be configured, using the same script, to (i) go to the at least one selected web resource, (ii) parse the list and save the list in the geographic database, adding respective country name and an area identifier accepted, for the given country, to designate administrative divisions thereof. For example, for the USA, the area identifier can be a ZIP or postal code; for the Russian Federation, the area identifier can be a post index, and the like.

Alternatively, in some non-limiting embodiments of the present technology, the processor 201 can be configured to generate the geographic database based on commonly known open web resources such as worldpostalcodes.org, ropoga-poccH5Lpil), etc. containing area identifier lists categorized by country.

Further, the processor 201 can be configured to merge the so generated lists for different countries. If a same area identifier is encountered in several countries, the processor 201 can be configured to add all these countries in a special consolidated list for this area identifier. The geographic database thus formed includes entries, each of which looks, for example, like this:

'90630'—Estonia, Finland, USA.

In additional non-limiting embodiments of the present technology, the geographic database for each country is provided with sets of keywords in the state languages of the respective country to designate respective entities where POS terminals can be installed. As a non-limiting example, the following sets of keywords for Russia, the United States, and Finland, respectively, can be provided:

Russia: банк, аптека, столовая, магазин, торговый центр, казино...
USA: drugstore, bank, foods, shop, mall, casino . . .
Finland: apteekki, pankki, ruokala, kauppa, supermarket, kasino . . .

Further, in certain non-limiting embodiments of the present technology, the processor 201 can be configured to generate a database of entities, such as commercial companies, for each country. The processor 201 can be configured to generate the database of commercial companies on the basis of a country-specific list of area identifiers (for example, list of postal codes existing in the given country).

Further, in some non-limiting embodiments of the present technology, the processor 201 can be configured to (i) determine, for each area identifier (for example, located within an area corresponding to a definite ZIP code in USA), for each of the countries, a list of POSs (including, for example, offices, shops, restaurants, bank branches, etc.); and (ii) save the so determined list in the database of entities.

To do so, for example, the processor 201 can be configured for generating respective queries to one or more open web source, such as Google Maps™, GIS2™, Mapsme™, Yandex Maps™, or Yellow Pages™, as an example, with syntaxes specific for these open web source from using a preliminarily prepared script. If, for example, to query Google Maps™ to generate the list of POSs in Russia for the database of commercial companies is built for Russia, the processor 201 can be configured to submit search queries having the following look:

Россия индекс 123098 аптека (Russia index 123098 pharmacy),

Россия индекс 123098 банк (Russia index 123098 bank),

Россия индекс 123098 кафе (Russia index 123098 cafe),

Россия индекс 123098 магазин (Russia index 123098 shop),

Россия индекс 123098 торговый центр (Russia index 123098 supermarket), and so on. As it can be appreciated, in response, the given open web resource can be configured to return a set of names and post addresses of the corresponding points of sale located in the area corresponding to this index. Proper keywords such as bank, pharmacy, canteen, etc. are chosen specifically for the country, for which the database is being built.

Further, in some non-limiting embodiments of the present technology, the processor 201 can be configured to order the so obtained lists of points of sale by names of companies in any way, such as in ascending order of the post code, or alphabetic order of the entity names, and further save in the database of commercial companies in association with each of the respective area identifiers.

In additional non-limiting embodiments of the present technology, the processor 201 can be configured to associate each of the so identified entities in database of commercial companies with a respective area identifier where the given entity is located as well as all relevant HLATU. By way of example, the company Pharmacy "Floria", Moscow, 123098, Bochvara street, 10A in the database can be associated in any commonly known way with a post index 123098 and the following HLATUs: Northwestern Administrative District of Moscow, Moscow, Central Federal District of the Russian Federation.

Alternatively, the database of commercial companies for each country can be formed manually by operator.

Thus, the processor 201 can be configured to obtain the geographic database, in which each area identifier is associated with name of at least one country where the area denoted by this identifier is located, and the database of commercial companies, in which each entity, such as a commercial company, is associated with the respective area identifier, for example, a postal code or a post index, and at least one HLATU.

The method 100 hence proceeds to step 110.

Step 110: Receiving, by the Processor, Identifiers of a Plurality of Compromised Geographical Areas The method 100 begins at step 110 where the processor 201 is configured to receive area identifiers of a plurality of compromised geographical areas. As mentioned above, according to certain non-limiting embodiments of the present technology, the area identifiers can comprise, without limitation, postal codes, ZIP codes, post indexes, names and/or numbers of individual buildings, as well as names of streets, blocks, districts, cities, okrugs, counties, communes, voivodeships, provinces and other administrative and territorial units. Although, for clarity of explanation of the non-limiting embodiments of the present technology, in the description provided hereinbelow, the area identifiers are US postal codes (ZIP codes), it should be expressly understood that any other identifiers can be used instead in a similar way without limitation. Hereinafter postal codes may be referred to as simply codes or ZIP codes.

Also, in some non-limiting embodiments of the present technology, at step 110, along with the compromised geographical area identifiers, the processor 201 can be configured to obtain, from the dump database posted online for sale, additional information, for example, name of the country. To that end, for example, the processor 201 can be configured to execute a script that implements parser functions in order for automatic reading all text lines from the dump database, and further save these text lines.

In some non-limiting embodiments of the present technology, the processor 201 can further be configured for deduplicating the obtained list of compromised geographical area identifiers, that is, removing duplicate area identifiers from the list. As a result, the processor 201 is configured to obtain a modified list of unique compromised geographical area identifiers and save the modified list in the database.

By way of example, the plurality of compromised geographical area identifiers including 951 area identifiers is presented below.

['72076', '92867', '90630', '94565', '33612', '77379', '89123', '33809', '90712', '75056', '04106', '80016', '89052', '33169', '34741', '33467', '34119', '78045', '17404', '75070', '92083', '65804', '33511', '70663', '07457', '85204', '72032', '28117', '85296', '37919', '71292', '76011', '72212', '85032', '76177', '33896', '30519', '81601', '78154', '23602', '30014', '80601', '33027', '75034', '78660', '29607', '75126', '78155', '80110', '76201', '67206', '23456', '78738', '32703', '74135', '92555', '27713', '48101', '14580', '33012', '84003', '72401', '07936', '30720', '01810', '78501', '34481', '73132', '78410', '85374', '78235', '30062', '37129', '28078', '32534', '78664', '30052', '34769', '85635', '48228', '34711', '76182', '32312', '85365', '32757', '28303', '68137', '75052', '35235', '27105', '92591', '33556', '33309', '28602', '77511', '28704', '08753', '30144', '10941', '91763', '95670', '77505', '73110', '35601', '90242', '01803', '33186', '33781', '44115', '85209', '90303', '11385', '72015', '30097', '01453', '32225', '32960', '95678', '33433', '80134', '94066', '04401', '85206', '28546', '36303', '75023', '75965', '33021', '71270', '02762', '78613', '33919', '92336', '76039', '81008', '92562', '33913', '75110', '91387', '90660', '17601', '79414', '33180', '77833', '33566', '39110', '02865', '32159', '47129', '76028', '37064', '32832', '70507', '37221', '74501', '77357', '76711', '92545', '07094', '34222', '32218', '95380', '33859', '77303', '28216', '32608', '32765', '76048', '86429', '34639', '75013', '85746', '86314', '71913', '33461', '34787', '10954', '77037', '95242', '73134', '79102', '10505', '32792', '32940', '86001', '33823', '85035', '03060', '21014', '27030', '78245', '33618', '33426', '92374', '37076', '76108', '78028', '75771', '74008', '75211', '28805', '28470', '33324', '93907', '95630', '24740', '30106', '33126', '39206', '79606', '32746', '87110', '73505', '75119', '93534', '06492', '77840', '91910', '77338', '77573', '78109', '80124', '85086', '34613', '33062', '95928', '33132', '33909', '80011', '95122', '95037', '17111', '74401', '32701', '34668', '11735', '71457', '93230', '06010', '78572', '06484', '75062', '75237', '91765', '28262', '93312', '76063', '72450', '92408', '37115', '78541', '03784', '78596', '30542', '07424', '37027', '75901', '33030', '28217', '48104', '70791', '27203', '7'8753', '34689', '37415', '78205', '37604', '93277', '32503', '80123',

'78610', '78745', '91784', '76021', '33323', '65616', '27502', '87123', '75156', '45440', '01501', '33410', '92223', '77581', '32818', '77085', '07073', '87124', '28056', '78752', '77396', '31322', '48375', '76132', '33543', '70068', '15122', '37203', '37214', '78526', '80234', '28043', '30078', '71603', '32003', '37701', '76401', '78634', '24012', '71446', '07310', '30101', '30161', '11590', '90620', '85737', '02150', '14564', '84065', '70301', '29621', '77027', '77346', '85051', '64081', '30121', '39503', '77571', '93551', '75503', '30043', '92108', '92508', '78259', '89118', '88201', '90605', '95051', '26501', '74012', '06702', '32405', '33763', '48150', '30013', '06095', '72956', '32826', '70816', '95758', '77007', '77515', '33778', '33414', '83706', '92311', '30189', '70726', '75040', '34266', '37772', '77598', '91320', '23322', '78332', '80023', '48917', '37067', '80246', '30534', '15904', '27529', '48083', '92025', '95993', '77079', '78748', '06416', '81505', '71105', '15238', '93313', '95687', '91324', '75063', '33409', '11731', '27545', '70560', '79072', '79936', '84014', '21093', '74133', '77354', '84720', '92886', '34293', '85743', '34986', '92392', '93274', '81101', '64057', '91730', '68505', '05201', '38138', '27262', '21236', '11714', '78602', '91709', '29730', '91307', '48092', '70460', '30606', '73703', '88310', '78102', '25801', '77388', '75218', '75662', '95356', '7'2756', '77070', '76502', '89503', '80922', '88240', '34997', '37934', '27587', '93036', '32174', '38017', '34957', '30096', '88220', '85027', '32258', '94531', '27103', '33071', '72802', '93117', '70808', '32571', '74464', '46142', '95118', '33156', '13214', '16148', '85201', '27403', '72143', '92606', '38501', '78852', '21222', '90503', '31406', '76801', '34714', '41042', '87106', '32114', '93635', '02904', '48307', '32086', '76148', '77656', '74075', '75098', '77040', '95035', '28025', '94520', '48316', '93065', '80538', '94588', '08816', '01851', '30269', '28607', '60450', '75022', '91915', '80501', '78654', '71301', '74601', '33625', '94587', '75149', '94538', '17050', '91381', '91748', '33331', '30141', '94550', '37066', '80634', '06040', '75801', '13021', '34606', '64801', '80525', '25504', '73401', '32177', '28277', '30324', '78064', '07724', '07733', '14845', '30338', '30022', '06070', '87532', '14221', '03079', '70471', '28403', '33541', '39402', '48195', '89117', '23666', '02184', '30501', '79924', '06382', '12077', '77449', '85226', '77630', '07446', '23510', '32809', '94928', '12205', '28227', '80108', '75090', '75670', '02917', '76087', '92532', '74019', '05495', '37402', '75605', '34429', '02032', '06351', '95834', '10950', '30329', '75044', '76067', '06489', '17013', '33948', '06111', '85281', '12601', '93955', '10994', '93720', '91750', '84790', '91316', '41076', '86403', '78749', '15237', '77550', '13090', '78570', '79925', '34677', '77459', '45805', '29418', '31909', '75087', '32256', '70526', '20166', '38606', '11706', '43302', '77565', '77380', '95010', '76710', '84070', '92881', '13850', '45044', '14226', '71111', '30047', '07836', '89109', '77494', '06320', '21784', '92054', '30253', '77478', '80026', '79423', '01035', '77429', '77414', '84102', '27896', '02379', '33596', '06810', '48066', '15601', '27540', '01867', '85305', '72205', '77521', '06033', '33477', '90802', '73099', '80132', '27617', '38655', '28625', '07728', '69101', '74361', '30260', '91016', '14304', '08902', '32097', '87402', '78539', '75150', '76262', '78666', '80021', '75028', '87507', '78582', '41017', '93446', '02842', '84084', '28387', '02767', '77065', '78520', '27804', '70809', '78130', '28273', '37160', '68510', '78503', '28226', '02360', '14850', '37090', '79109', '33024', '43219', '38671', '87031', '64506', '80012', '27534', '10314', '77057', '95020', '77034', '78412', '85541', '11720', '43240', '01128', '88101', '87004', '87120', '32536', '06512', '60435', '08822', '76033', '37167', '45251', '78230', '75007', '84404', '11742', '76904', '78750', '16602', '34233', '45424', '76548', '39465', '90266', '45069', '76309', '46368', '78006', '78756', '40353', '90631', '75104', '75460', '77377', '40601', '79705', '76240', '32413', '35806', '70058', '75165', '38133', '43056', '40511', '73118', '72903', '01923', '23185', '44446', '76543', '78209', '01886', '33615', '38305', '85042', '03276', '76308', '78250', '85210', '85382', '43623', '46804', '43512', '45013', '92656', '45373', '77584', '91791', '92024', '75230', '34231', '02019', '45504', '38117', '44906', '70737', '40324', '47374', '75248', '70601', '45420', '70401', '46805', '45245', '75402', '68521', '92691', '77640', '60123', '66604', '77029', '38804', '40503', '72653', '30041', '45040', '66801', '79121', '64055', '45459', '73013', '34208', '36535', '74055', '84119', '45385', '75081', '30286', '68516', '43202', '23321', '80033', '82009', '45014', '78758', '64468', '60440', '43068', '70510', '68601', '77471', '85339', '85711', '92110', '12065', '80918', '45011', '76051', '43026', '40422', '15401', '40475', '46410', '43130', '66502', '46383', '46825', '75701', '85205', '45255', '46530', '30004', '40356', '45840', '03874', '45449', '70360', '46580', '78573', '45066', '07652', '78550', '85284', '61354', '74820', '85008', '41056', '85302', '46703', '78504', '46526', '74701', '46706', '43123', '45365', '44512', '46375', '46750', '43040', '71291', '43537', '85012', '85282', '43617', '60805', '82070', '68847', '08820', '46818', '45231', '85395', '32550', '45238', '78374', '46321', '60115', '60050', '86301', '82636', '60099', '40391', '85705', '46563', '60525', '43420', '45601', '43536', '82716', '60409', '46514', '46755', '85741', '60915', '73533', '46628', '46614', '82901', '68467', '79106', '39564', '68803', '60652', '78521', '60478', '73521', '69162', '68901', '60707', '84041', '33559', '77024', '75088', '32223', '43228', '85122', '74006', '76137', '30331', '32801', '53201', '89044', '19019', '30301', '33601', '60007', '60090', '60148', '60290', '66217', '67114', '73101', '80002', '80010', '80020', '80126', '80301', '80521', '81433', '81615', '89002', '89028', '91355', '92071', '92647', '94301'].

In the above example, only area identifiers were extracted from the dump database, and there are no indications of a country(-ies) related to these identifiers. However, in other non-limiting embodiments of the present technology, the processor 201 can be configured to query the geographic database generated as described above to obtain, for each of the compromise area identifier, information of the respective country associated therewith.

For example, the processor 201 can be configured to submit the following queries to the geographic database: '72076', '92867', and '90630', which may further result in the geographic database returning the following information on the countries associated with the submitted area identifiers:

'72076'—Germany, USA,
'92867'—USA,
'90630'—Estonia, Finland, USA,

Further, based on these results, the processor 201 can be configured to determine that the above identifiers are associated with the United States.

In other non-limiting embodiments of the present technology, the processor 201 is configured to obtain both the compromised geographical area identifiers and information about countries associated therewith from the dump database.

The method 100 hence proceeds to step 120.

Step 120: Identifying, by the Processor, in a Given Compromised Geographical Area of the Plurality of Compromised Geographical Areas, at Least One Respective POS Terminal Network of a Plurality of POS Terminal Networks At step 120, according to certain non-limiting embodiments of the present technology, the processor 201 can be configured to identify, in a given compromised geographical area of the plurality of compromised geographical areas obtained at step 110, at least one POS terminal network. In the context of the present specification, a given POS terminal network denotes all POS terminals owned by a respective entity, such as a commercial company, and located in the given compromised geographical area.

For example, to identify the at least one POS terminal network, the processor 201 can be configured to query the database of the commercial companies generated as described further above.

The method 100 hence advances to step 130.

Step 130: Generating, by the Processor, a Potentially Compromised POS Terminal Networks Database Including the Plurality of POS Terminal Networks At step 130, the processor 201 can be configured to identify other POS terminal networks as described at step 120, to generate a database of potentially compromised POS terminal networks. According to certain non-limiting embodiments of the present technology, this database includes the plurality compromised geographical area identifiers obtained at step 110, each area identifier being associated with a list of entities that own POS terminals located in the respective compromised geographical area, and each POS being provided with its post address.

In additional non-limiting embodiments of the present technology, at this step, the processor 201 can be configured to assign, to each area identifier, a respective HLATU corresponding to a respective country. Returning to the above example, where US ZIP codes are used as the compromised geographical area identifiers, the respective HLATU can be, for example, the state related to a given ZIP code.

In some non-limiting embodiments of the present technology, to generate the database of potentially compromised POS terminal networks, the processor 201 can be configured to submit queries to the open web sources such as Google Maps™, GIS2™, Mapsme™, Yandex Maps™, or Yellow Pages™ with syntax specific for these sources, using a pre-configured program script. If, for example, Google Maps™ are used as the open web source, then search queries generated for the area identifier 90630 may have the following look:

usa postal code 90630 drugstore (in response, the search can return a list of names and addresses of pharmacies located in the area corresponding to ZIP code 90630),
    usa postal code 90630 bank (a list of banks will be returned),
    usa postal code 90630 foods (a list of public catering establishments will be returned),
    usa postal code 90630 shop (a list of shops will be returned),
    usa postal code 90630 mall (a list of supermarkets will be returned),
    usa postal code 90630 casino (a list of gambling establishments will be returned), and so on.

The keywords such as bank, shop, foods, as well as the name of country and particular area identifier for the queries (in above examples, it was 'postal code' while in queries in Russian it would be 'post index', etc.) are selected by the script from the geographic database in accordance with rules of the country associated with compromised geographical area identifiers.

Further, the processor 201 can be configured to order the lists of POS terminal networks so obtained for each area identifier, such as by names of entities, and save the ordered list in the database of potentially compromised POS terminal networks in association with those identifier for which each list was built. For example, a fragment of such list for ID 90630 might look like this:

Marshalls, 9801 Walker St, Cypress, CA 90630.
    . . .
    McDonald's, 10011 Valley View St, Cypress, CA 90630,
    McDonald's, 4125 Ball Rd, Cypress, CA 90630, In alternative non-limiting embodiments of the present technology, the processor 201 can be configured to query the preliminary generated database of commercial companies rather than the open web sources such as Google Maps™. In such a case, the processor 201 can be configured to submit respective queries to the database of commercial companies corresponding to the country associated with the obtained compromised geographical area identifiers, each query containing the respective compromised geographical area identifier from the plurality of area identifiers obtained at step 110.

In response to each such request, the processor 201 can be configured to obtain a respective list of POS terminal networks corresponding to a respective area identifier from the database of commercial companies.

Additionally, in some non-limiting embodiments of the present technology, the processor 201 can be configured to identify names of entities that own the POS terminal networks from the list of POS terminal networks built for each area identifier as described above. Further, the processor 201 can be configured to save both the so obtained lists of POS terminal networks and company names in the database of potentially compromised POS terminal networks.

For example, the processor 201 can be configured to obtain the following list of entities owning POS terminal networks with addresses corresponding to the area identifier 90630:
    Marshalls,
    Nothing Bundt Cakes,
    Five Guys,
    AT&T,
    Verizon Wireless,
    McDonald's.

In additional non-limiting embodiments of the present technology, the processor 201 can be configured to assign, in the database of potentially compromised POS terminal networks, to each compromised geographical area identifier, at least one HLATU. To do this, the processor 201 can be configured to generate and submit, as described above, a respective query to a search engine, such as the Google™ search engine, the Yandex™ search engine, a Bing™ search engine, and the like. For example, for the aforementioned ZIP code 90630, the respective search query may look like the following:
    usa postal code 90630

In response to such a query, the processor 201 can be configured to receive, from the search engine, information about HLATU corresponding to queried ZIP code, such as:
Orange County, CA, USA.

Either county, or state, or both can be indicated as HLATU in accordance with various non-limiting embodiments of the present technology. A state as a HLATU will be shown hereinafter as a non-limiting example.

In other non-limiting embodiments of the present technology, to determine the respective HLATU, the processor 201 can be configured to submit the respective query, as described above, to the database of commercial companies, using the respective compromised geographical area identifier as the keyword in the respective query. In response, the processor 201 can be configured to receive, from the database of commercial companies, a list of POS terminal networks located within indicated area with HLATUs (identical for all found companies, as it may become apparent) assigned to each of the previously identified POS terminal networks.

Further, the processor 201 can be configured to save the respective HLATUs obtained for each compromised geographical area identifier in the database of potentially compromised POS terminal networks using any of approaches mentioned above.

For example, for the compromised geographical area identifiers associated with the US, the processor 201 can be configured to determine and further save in the database the following list of higher level US territorial divisions (states): ['AL', 'PA', 'OK', 'VA', 'OH', 'MI', 'NM', 'MA', 'AZ', 'CA', 'LA', 'IL', 'NE', 'NV', 'TN', 'ID', 'NH', 'TX', 'CT', 'MS', 'ME', 'CO', 'NY', 'WV', 'FL', 'NJ', 'MD', 'KS', 'VT', 'KY', 'MO', 'NC', 'UT', 'IN', 'RI', 'GA', 'WY', 'AR', 'SC']. This list of HLATU includes all states that have at least one ZIP code from the originally obtained plurality of compromised geographical area identifiers.

Then, in some non-limiting embodiments of the present technology, the processor 201 can be configured to (i) determine a numerical value corresponding to a respective total number of POS terminal networks (offices, shops, restaurants, bank branches, etc.) owned by each potentially compromised entity and located in one of above HLATUs where at least one compromised geographical area identifier was found; and (ii) save in the database for each entity. To do this, a query to a search engine, for example, the Google™ search engine, is submitted, by the processor 201 executing the respective script. For example, for the State of California (CA) and the entity of the McDonald's company, the respective query can be following:
us a california mcdonald's In response to such query, the search engine will return a list of POS terminal networks (in this case, restaurants) owned by the specified company and located within territory of the specified state. Further, the processor 201 is configured to determine the length of this list, that is, the number of restaurants thereof as being the respective total number of POS terminal networks associated with the given entity.

In other non-limiting embodiments of the present technology, to determine the total number of POS terminal networks associated with the given entity, the processor 201 can be configured to submit the respective query, including the name of the given entity, to the database of commercial companies in desired country and its HLATU. In response, the processor 201 can be configured to receive the respective list of POS terminal networks owned by the given entity and located within indicated HLATU; and determine the length (number of lines) of this list as being the total number of the POS terminal networks associated with the given entity.

Further, the processor 201 can be configured to save the respective total numbers of POS terminal networks in association with (i) each entity in the database of potentially compromised POS terminal networks; and (ii) the respective HLATU, which for example, can have the following look:
McDonald's, CA, 1221.

Thus, the processor 201 can be configured to generate the database of potentially compromised POS terminal networks.

It should be noted that the above listed approaches of extracting information from open web sources to form a database of potentially compromised POS terminal networks are not exhaustive and serve only as an example.

The method 100 hence proceeds to step 140.

Step 140: Determining, by the Processor, for the at Least One Respective Pos Terminal Network, a Plurality of Compromise Parameters At step 140, according to certain non-limiting embodiments of the present technology, the processor 201 can be configured to determine, for each of the POS terminal networks the database of potentially compromised POS terminal networks identified at the previous steps, a plurality of compromise parameters.

Figure 1B:
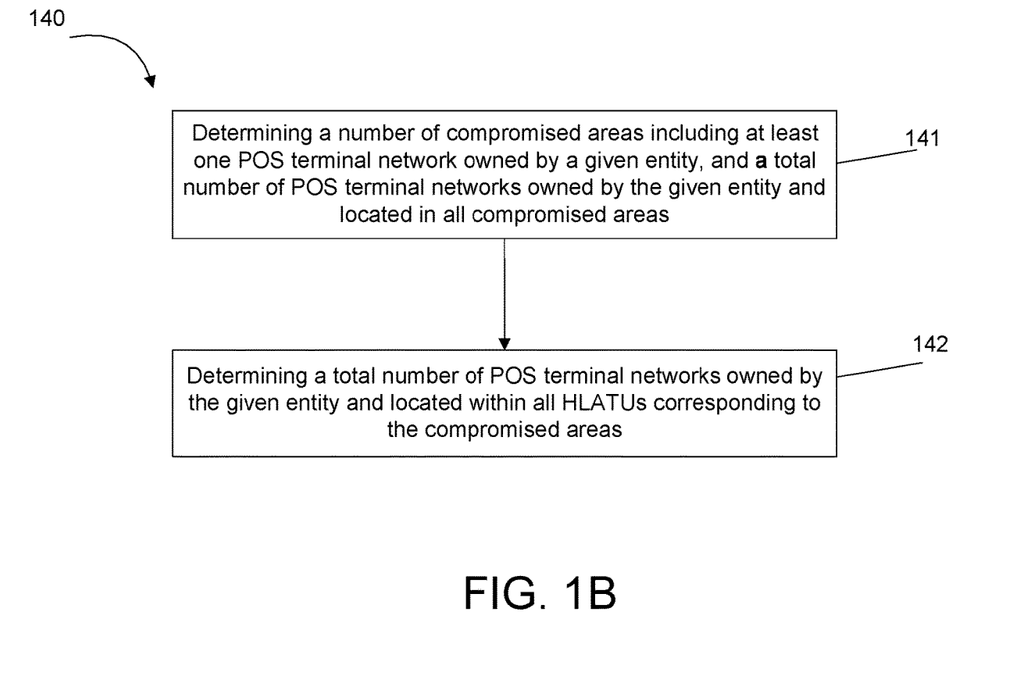
FIG. 1B depicts a flowchart diagram of a step of the method of FIG. 1A for determining a plurality of compromise parameters of a given POS terminal network, in accordance with certain non-limiting embodiments of the present technology.

With reference to FIG. 1B, there is depicted a flowchart diagram of step 140, in accordance with certain non-limiting embodiments of the present technology.

In accordance with certain non-limiting embodiments of the present technology, to determine a probability value of the at least one POS terminal network being compromised, the processor 201 can be configured at least one of the following compromise parameters of the plurality of compromise parameters:
  zip_kf: a frequency of occurrence of POS terminal networks owned by the given entity in the plurality of compromise areas; and
  cmp_kf: a probability of occurrence of the POS terminals networks (or points of sale) owned by the given entity in the plurality of compromised geographical areas.

In some non-limiting embodiments of the present technology, the processor 201 can be configured to determine the frequency of occurrence of the POS terminal networks associated with the given entity as a ratio between a number of compromised geographical areas including at least one POS terminals network owned by the given entity ($Z\_1$) and the total number of compromised geographical areas ($Z$) of the plurality of compromised geographical areas;

Further, in some non-limiting embodiments of the present technology, the processor 201 can be configured to determine the probability of occurrence of the POS terminal networks associated with the given entity as a ratio between a number of the POS terminals networks (or selling venues) owned by the given entity and located within the compromised geographical areas ($B\_Z$) and the total number of POS-terminal networks owned by given entity and located within all HLATUs corresponding to the compromised geographical areas ($B\_S$).

Sub-step 141: Determining a Number of Compromised Geographical Areas Including at Least One POS Terminal Network Owned by a Given Entity, and a Total Number of POS Terminal Networks Owned by the Given Entity and Located in All Compromised Geographical Areas At the first sub-step 141 of step 140, according to certain non-limiting embodiments of the present technology, the processor 201 can be configured to determine the number of area identifiers of compromised geographical areas where the given entity is represented (Z_1). To do this, the processor 201 can be configured to submit a receptive search query with the keyword including the name of the given entity of the plurality of entities obtained at step 130 to the database of potentially compromised POS terminal networks. In response to this query, the processor 201 can be configured to receive all lines containing the name of the given entity. As described above with respect to step 130, each POS terminal network owned by the given entity will be provided with the respective area identifier of the compromised geographical area (in the example above, it is the ZIP code) where the given POS terminal network is located.

Further, the processor 201 can be configured to determine the number of unique (that is, considered only once) compromised geographical area identifiers, thereby determining the number of compromised geographical areas having the at least one POS terminal network associated with the given entity (Z_1).

Further, the processor 201 can be configured to determine, based on the number of lines in the returned list of POS terminal networks owned by the given entity, the parameter B_Z, that is, the number of POS terminals (or selling venues) owned by the given entity and located in all of the plurality of compromised geographical areas.

For example, the processor 201 can be configured to submit, to the database of potentially compromised POS terminal networks, the search query being:

McDonald's

A list of all McDonald's restaurants found in step 130 will be returned in response to this query. Next, a number of different compromised geographical area identifiers (ZIP codes) in list of restaurants obtained is counted. In the above example, such count considering the number of different identifiers equals 311.

Further, the processor 201 can be configured to determine the total length (number of lines) of the obtained list of McDonald's restaurants, thereby determining the value of the B_Z parameter, that is, the total number of these restaurant in all compromised geographical areas (including repetitions of the respective area identifiers); in the considered example, it turned out to be 408.

Further, the processor 201 can be configured to determine these parameters for each entity in the database of the potentially compromised POS terminal networks. Further, the processor 201 can be configured to save the calculation results in the database, for example, in the following form (in entry format 'entity name', Z_1, B_Z):

Marshalls, 61, 79
Nothing Bundt Cakes, 61, 61
Five Guys, 119, 124
AT&T, 121, 131
Verizon Wireless, 129, 146
McDonald's, 311, 408

In additional non-limiting embodiments of the present technology, at sub-step 141, the processor 201 can be configured to determine the total number of compromised geographical areas (Z). Since this number is equal to the number of different compromised geographical area identifiers obtained at step 110, the processor 201 can be configured to determine this value by counting unique compromised geographical area identifiers contained in the database of potentially compromised POS terminal networks. The resulting value is saved, for example, in a separate field Z of the database. In the current example Z=951.

The step 140 of the method 100 thus advances to sub-step (142).

Sub-Step 142: Determining a Total Number of Pos Terminal Networks Owned by the Given Entity and Located within all Hlatus Corresponding to the Compromised Geographical Areas At sub-step 142, according to certain non-limiting embodiments of the present technology, the processor 201 can be configured to determine the total number of the POS terminal networks owned by the given entity and located within all HLATUs corresponding to the compromised geographical areas. As it can be appreciated, the processor 201 can be configured to obtain a list of all HLATUs corresponding to compromised geographical areas as described above at step 130. Further, as described with respect to step 130, the processor 201 could be configured to (i) obtain information about numbers of POS terminal networks located within all such HLATUs; and (ii) save this information in the database of potentially compromised POS terminal networks.

Thus, to determine the total number of the POS terminal networks owned by the given entity and located within all HLATUs associated with compromised geographical areas, the processor 201 can be configured to submit the respective search query to the database of potentially compromised POS terminal networks. This query may comprise HLATU and name of company.

The query may look, for example, as follows:

MacDonald's, CA

The response to such query will contain the number of POS terminal networks owned by the given entity and located within queried HLATU. In the current example, the total number of MacDonald's POS terminal networks in California is determined as being 1221.

Further, the processor 201 can be configured to submit similar queries for all HLATUs corresponding to the compromised geographical areas. Thus, the processor 201 can be configured to determine value B_S representing the total number of POS terminal networks owned by the given entity and located within all compromised HLATUs, which, in the current example for McDonald's is equal to 3129. The processor 201 can further be configured to save the respective values of the parameter B_S in the database of potentially compromised POS terminal networks.

In alternative non-limiting embodiments of the present technology, if the information about the numbers of the POS terminal networks associated with each of the entities and located within each HLATU corresponding to the compromised geographical areas has not been saved at step 130, these values can be determined at this step in real time in a similar manner.

For example, the processor 201 can be configured to save the respective values of B_S parameter for each of the entity in a following format: 'entity name', Z_1, B_Z, B_S:

Marshalls, 61, 79, 202
Nothing Bundt Cakes, 61, 61, 311
Five Guys, 119, 124, 573
AT&T, 121, 131, 2982
Verizon Wireless, 129, 146, 933
McDonald's, 311, 408, 3129

Thus, based on these values Z_1, B_Z, B_S, the processor 201 can be configured to determine the values of the parameters zip_kf and cmp_kf for each entity in the database of potentially compromised POS terminal networks, as will be described below.

Step 140 hence terminates, and the method 100 proceeds to step 150 as depicted in FIG. 1A.

Step 150: Determining, by the Processor, Based on the Plurality of Compromise Parameters, a Respective Compromise Probability Value for the at Least One Respective POS Terminal Network At step 150, according to certain non-limiting embodiments of the present technology, the processor 201 can be configured to determine a respective compromise probability for the at least one POS terminal network owned by the given entity. In some non-limiting embodiments of the present technology, the processor 201 can be configured to determine this value, sort_kf, according to a formula:

$$sort\_kf = zip\_kf * cmp\_kf,$$

where zip_kf is the frequency of occurrence of the POS terminal networks owned by the given entity in the plurality of compromise areas;

and cmp_kf is the probability of occurrence of the POS terminals networks (or points of sale) owned by the given entity in the plurality of compromised geographical areas.

As mentioned above, parameter zip_kf, is determined as a ratio of the number of compromised geographical areas containing at least one POS terminals network owned by the given entity (Z_1) to the total number of compromised geographical areas (Z):

$$zip\_kf = Z\_1/Z,$$

while parameter cmp_kf is determined as a ratio of the number of POS terminals networks (or points of sale) owned by the given entity and located within the compromised geographical areas (B_Z) to the total number of POS-terminal networks owned by the given entity and located within all HLATUs corresponding to the compromised geographical areas (B_S):

$$cmp\_kf = B\_Z\_1/B\_S.$$

In other non-limiting embodiments of the present technology, the processor 201 can eb configured to determine the respective compromise probability value for the at least one POS terminal network associated with the given entity, sort_kf, according to a formula:

$$sort\_kf = zip\_kf * cmp\_kf^2.$$

In yet other non-limiting embodiments of the present technology, the processor 201 can be configured to determine the respective value of the sort_kf parameter according to a formula:

$$sort\_kf = zip\_kf^3 * cmp\_kf.$$

By doing so, the processor 201 can be configured to determine the respective compromise probability values for each of the entities in the database of potentially compromised POS terminal networks and further save these values therein for further use in determining whether the at least one POS terminal network is compromised.

Continuing with the above example, in response to the query including the company name 'McDonald's', values Z_1=311, B_Z=408 and B_S=3129 can be obtained from the database. The value of the parameter Z representing the total number of compromised geographical area identifiers is identical for all entities, and in this example is Z=951.

Thus, in the current example, the processor 201 can be configured to determine and further save, in the database of potentially compromised POS terminal networks, the respective compromise probability value for McDonald's POS networks being sort_kf=0.0426417.

It should be noted that, according to certain non-limiting embodiments of the present technology, steps 140 and 150 can be executed by the processor 201 each time for each given POS terminal network. More specifically, the processor 201 can be configured to execute steps 140 and 150 iteratively until they are completed for all entities listed in the database of potentially compromised POS terminal networks.

In some non-limiting embodiments of the present technology, the processor 201 can be configured to execute steps 140 and 150 in parallel, in multi-threading mode, simultaneously for at least some of entities in the database of potentially compromised POS terminal network.

In additional non-limiting embodiments of the present technology, the processor 201 can further be configured to verify whether there are any remaining entities in the database of potentially compromised POS terminal network, to which steps 140 and 150 have not been applied. Further, based on the results of the verification, the method 100 can either return to step 140 or proceeds to step 160. More specifically, the method 100 returns to step 140, if there are remaining POS terminal networks in the list of POS terminal networks, for which the respective compromise probability value has not been determined. The method 100 proceeds to step 160 if the respective compromise probability value has been determined, by the processor 201, for each POS terminal networks in the database of potentially compromised POS terminal network.

Step 160: Ranking, by the Processor, the Plurality of POS Terminal Networks According to Respective Compromise Probability Values Associated Therewith, Thereby Generating a Ranked List of POS Terminals Networks; Determining, by the Processor, a Top-Ranked POS Terminal Network in the Ranked List of POS Terminal Networks as Being the Compromised POS Terminal Network At step 160, according to certain non-limiting embodiments of the present technology, the processor 201 can be configured to rank the POS terminals networks according to their respective compromise probability values and further order the so ranked POS terminals networks, for example, in a descending order.

As a result, the processor 201 is configured to generate a ranked list of potentially compromised POS terminal networks, in which the networks are ordered in a descending order of their respective compromise probability values, that is, the values of the parameter sort_kf, determined at step 150. Further, the processor 201 can be configured to save the so ranked list of the POS terminal networks in the database of potentially compromised POS terminal networks.

For the example above, a portion of such a ranked list can have following look:

McDonald's, 0,042641696,
Five Guys, 0,027079055,
Marshalls, 0,025085632,
Verizon Wireless, 0,021226599,
Nothing Bundt Cakes, 0,012581104,
AT&T, 0,005589443.

Further, the processor 201 can be configured to determine a top-ranked POS terminal network, that is a POS terminal network with the highest respective compromise probability value in the ranked of POS terminal networks. Further, the processor 201 can be configured to determine the top-ranked POS terminal network as being compromised.

In other non-limiting embodiments of the present technology, the processor 201 can be configured to determine two or more top-ranked POS terminal networks the ranked list as being compromised. In yet other non-limiting embodiments of the present technology, the processor 201 can be configured to determine the given POS terminal networks that have respective compromise probability values exceeding a pre-determined probability threshold value as being compromised. For example, the pre-determined probability threshold value can be 0.97 of the highest respective compromise probability in the ranked list of POS terminal networks.

The method 100 hence advances to step 170.

Step 170: Storing, by the Processor, in the Potentially Compromised POS Terminal Networks Database, Data Indicative of the Top-Ranked POS Terminal Network Being Compromised Further, at step 170, the processor 201 can be configured to store data indicative of the compromised POS terminal network in the database of potentially compromised POS terminal networks.

Figure 2:
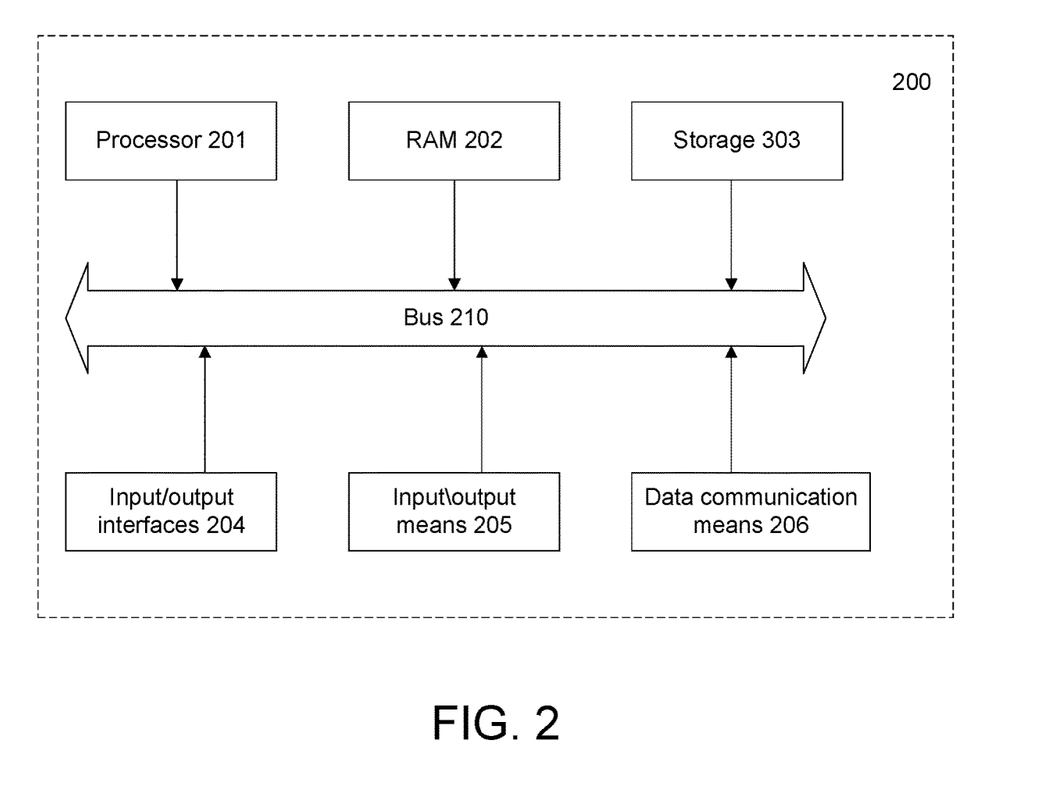
FIG. 2 depicts a schematic diagram of an example computing environment configurable for execution of the present method of FIG. 1A, in accordance with certain non-limiting embodiments of the present technology.

In additional non-limiting embodiments of the present technology, at step 170, the processor 201 can be configured to generate a message informing about at least one so identified compromised POS terminal network. The processor 201 can further be configured to cause transmission of this message via e-mail or any other known means of data transmission. Alternatively, the processor 201 can be configured to cause display of this message on a screen in a respective graphical interface of an electronic device comprising the computing environment 200 described below. In the example above, the McDonald's company's POS terminals network will be identified as the compromised one.

The method 100 hence terminates.

Computing Environment

With reference to FIG. 2, there is depicted an example functional diagram of the computing environment 200 configurable to implement certain non-limiting embodiments of the present technology including the method 100 described above.

In some non-limiting embodiments of the present technology, the computing environment 200 may include: the processor 201 comprising one or more central processing units (CPUs), at least one non-transitory computer-readable memory 202 (RAM), a storage 203, input/output interfaces 204, input/output means 205, data communication means 206.

According to some non-limiting embodiments of the present technology, the processor 201 may be configured to execute specific program instructions the computations as required for the computing environment 200 to function properly or to ensure the functioning of one or more of its components. The processor 201 may further be configured to execute specific machine-readable instructions stored in the at least one non-transitory computer-readable memory 202, for example, those causing the computing environment 200 to execute the method 100.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 202 may be implemented as RAM and contains the necessary program logic to provide the requisite functionality.

The storage 203 may be implemented as at least one of an HDD drive, an SSD drive, a RAID array, a network storage, a flash memory, an optical drive (such as CD, DVD, MD, Blu-ray), etc. The storage 203 may be configured for long-term storage of various data, e.g., the aforementioned documents with user data sets, databases with the time intervals measured for each user, user IDs, etc.

The input/output interfaces 204 may comprise various interfaces, such as at least one of USB, RS232, RJ45, LPT, COM, HDMI, PS/2, Lightning, FireWire, etc.

The input/output means 205 may include at least one of a keyboard, joystick, (touchscreen) display, projector, touchpad, mouse, trackball, stylus, speakers, microphone, and the like. A communication link between each one of the input/output means 205 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 206 may be selected based on a particular implementation of the communication network 120 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 200 may be linked together using a common data bus 210.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method of identifying a compromised Point-of-Sale (POS) terminal network, the method comprising:
generating a commercial entities database for a given geographical area of a plurality of geographical areas by executing a pre-configured script as a search robot, wherein the commercial entities database includes entries having (i) a respective identifier of the given geographical area and (ii commercial entities present in the given geographical area, and the entries are obtained from results of a plurality of search queries sent by the search robot to crawl and parse a communication network for the given geographical area;
accessing one or more card dump databases which include: (i) card dumps and (ii) respective identifiers of geographical areas where the card dumps were obtained;
identifying, using the one or more card dump databases and the commercial entities database, identifiers of a plurality of compromised geographical areas;
identifying in a given compromised geographical area of the plurality of compromised geographical areas, at least one respective POS terminal network of a plurality of POS terminal networks,
the at least one respective POS terminal network including a plurality of POS terminals in the given compromised geographical area associated with a respective commercial entity;

using the commercial entities database, identifying, for a given commercial entity present in the given compromised geographical area, based on the respective identifier thereof, POS terminal networks associated with the given commercial entity;

generating a potentially compromised POS terminal networks database including, for the given commercial entity, the POS terminal networks associated therewith;

determining, for the at least one respective POS terminal network, a plurality of compromise parameters, the plurality of compromise parameters including:
   a frequency of occurrence of POS terminal networks associated with the respective commercial entity in the plurality of compromised geographical areas; and
   a probability of occurrence of the POS terminal networks associated with the respective commercial entity in the plurality of compromised geographical areas;

determining, based on the plurality of compromise parameters, a respective compromise probability value for each POS terminal network of the plurality of POS terminal networks according to at least one equation selected from a group of equations consisting of:

$$sort\_kf = zip\_kf * cmp\_kf^2,$$

$$sort\_kf = zip\_kf^3 * cmp\_kf,$$

where sort_kf is the respective compromise probability value,
   zip_kf is the frequency of occurrence of the POS terminal networks associated with the respective commercial entity in the plurality of compromised geographical areas, and
   cmp_kf is the probability of occurrence of the POS terminal networks associated with the respective commercial entity in the plurality of compromised geographical areas;

ranking the plurality of POS terminal networks according to respective compromise probability values determined therefor, thereby generating a ranked list of POS terminal networks;

determining a top-ranked POS terminal network in the ranked list of POS terminal networks as being the compromised POS terminal network; and causing generation of a warning message of the top-ranked POS terminal network being compromised for display thereof on a screen of an electronic device.

2. The method of claim 1, wherein: prior to the generating the commercial entities database, the method comprises generating a first database including for the given geographical area the respective identifier of the given geographical area;
   and
   after the identifying the identifiers of the plurality of compromised geographical areas, the method further comprises determining, by submitting a respective query to the first database, a respective territorial unit of a plurality of territorial units, with which the plurality of compromised geographical areas is associated.

3. The method of claim 1, wherein the determining the plurality of compromise parameters comprises querying the commercial entities database.

4. The method of claim 1, wherein the potentially compromised POS terminal networks database is configured to store at least one selected from a group consisted of:
   the identifiers of the plurality of compromised geographical areas;
   names of respective commercial entities, whose POS terminal networks are located in respective ones of the plurality of compromised geographical areas;
   addresses of the respective commercial entities, whose POS terminal networks are located in the respective ones of the plurality of compromised geographical areas, and territorial units corresponding to each one of the plurality of the compromised geographical areas.

5. The method of claim 1, wherein the determining the plurality of compromise parameters of the at least one respective POS terminal network comprises determining:
   a number of compromised geographical areas having at least one POS terminal network associated with the respective commercial entity;
   a total number of compromised geographical areas in the plurality of compromised geographical areas;
   a number of POS terminal networks associated with the respective commercial entity in the plurality of compromised geographical areas, and
   a total number of POS terminal networks associated with the respective commercial entity, located in each one of a plurality of territorial units,
      a respective one of the plurality of territorial units including the plurality of compromised geographical areas.

6. The method of claim 5, wherein the frequency of occurrence of the POS terminal networks associated with the respective commercial entity in the plurality of compromised geographical areas is determined as a ratio between the number of compromised geographical areas having at least one POS terminal network associated with the respective commercial entity and the total number of compromised geographical areas in the plurality of compromised geographical areas.

7. The method of claim 5, wherein the probability of occurrence of the POS terminal networks associated with the respective commercial entity in the plurality of compromised geographical areas is determined as a ratio between the number of POS terminal networks associated with the respective commercial entity in the plurality of compromised geographical areas and the total number of the POS terminal networks associated with the respective commercial entity, located in each one of the plurality of territorial units.

8. The method of claim 1, wherein the determining the respective compromise probability value for the at least one respective POS terminal network comprises multiplying between the frequency and the probability of occurrence of the POS terminal networks associated with the respective commercial entity in the plurality of compromised geographical areas.

9. The method of claim 1, wherein the determining the top-ranked POS terminal network comprises determining a sub-set of top-ranked POS terminal networks in the ranked list of POS terminal networks whose respective compromise probability values do not exceed a predetermined compromise probability threshold value.

10. A system for identifying a compromised Point-of-Sale (POS) terminal network, the system comprising at least one processor and a non-transitory computer-readable memory storing instructions, which, when executed by the at least one processor, cause the system to:

generate a commercial entities database for a given geographical area of a plurality of geographical areas by executing a pre-configured script as a search robot, wherein the commercial entities database includes entries having (i) a respective identifier of the given geographical area and (ii) commercial entities present in the given geographical area, and the entries are obtained from results of a plurality of search queries sent by the search robot to crawl and parse a communication network for the given geographical area;

access one or more card dump databases which include: (i) card dumps and (ii) respective identifiers of geographical areas where the card dumps were obtained;

identify, using the one or more card dump databases and the commercial entities database, identifiers of a plurality of compromised geographical areas;

identify in a given compromised geographical area of the plurality of compromised geographical areas, at least one respective POS terminal network of a plurality of POS terminal networks,
  the at least one respective POS terminal network including a plurality of POS terminals in the given compromised geographical area associated with a respective commercial entity;

use the commercial entities database to identify, for a given commercial entity present in the given compromised geographical area, based on the respective identifier thereof, POS terminal networks associated with the given commercial entity;

generate a potentially compromised POS terminal networks database including, for the given commercial entity, the POS terminal networks associated therewith;

determine, for the at least one respective POS terminal network, a plurality of compromise parameters, the plurality of compromise parameters including:

a frequency of occurrence of POS terminal networks associated with the respective commercial entity in the plurality of compromised geographical areas; and a probability of occurrence of the POS terminal networks associated with the respective commercial entity in the plurality of compromised geographical areas;

determine, based on the plurality of compromise parameters, a respective compromise probability value for each POS terminal network of the plurality of POS terminal networks according to at least one equation selected from a group of equations consisting of:

$$sort\_kf = zip\_kf * cmp\_kf^2,$$

$$sort\_kf = zip\_kf^3 * cmp\_kf,$$

where sort_kf is the respective compromise probability value,
  zip_kf is the frequency of occurrence of the POS terminal networks associated with the respective commercial entity in the plurality of compromised geographical areas, and
  cmp_kf is the probability of occurrence of the POS terminal networks associated with the respective commercial entity in the plurality of compromised geographical areas;

rank the plurality of POS terminal networks according to respective compromise probability values determined therefor, thereby generating a ranked list of POS terminal networks;

determine a top-ranked POS terminal network in the ranked list of POS terminal networks as being the compromised POS terminal network; and cause generation of a warning message of the top-ranked POS terminal network being compromised for display thereof on a screen of an electronic device.

* * * * *

UNITED STATES PATENT AND TRADEMARK OFFICE
CERTIFICATE OF CORRECTION

| | | |
|---|---|---|
| PATENT NO. | : 12,475,218 B2 | Page 1 of 1 |
| APPLICATION NO. | : 17/973004 | |
| DATED | : November 18, 2025 | |
| INVENTOR(S) | : Ruslan Chebesov | |

It is certified that error appears in the above-identified patent and that said Letters Patent is hereby corrected as shown below:

On the Title Page

Item (71) Applicant: should read --GROUP-IB GLOBAL PRIVATE LIMITED, Singapore (SG)--

Signed and Sealed this
Thirteenth Day of January, 2026

John A. Squires
*Director of the United States Patent and Trademark Office*